Patented Oct. 31, 1933

1,933,437

UNITED STATES PATENT OFFICE 1,933,437

ENAMEL FORMULA

Charles J. Kaspar, Baltimore, Md.

No Drawing. Application July 7, 1930
Serial No. 466,347

1 Claim. (Cl. 106—36.2)

This invention relates to a formula for enamel for bathtubs, lavatories, sinks, laundry trays, hospitals, household and decorative equipment and appliances and the like, the general object of the invention being to provide an enamel composed of substances, the chemical compositions of which do not vary, whereby a true standardization of the formula is secured.

The enamel consists of the following chemicals and are preferably used in the proportions given:—

| | Per cent |
|---|---|
| Flint, $SiO_2$ | 29.236 |
| Borax, $Na_2B_4O_7$ $(5H_2O)$ | 13.127 |
| Nitrate soda, $NaNO_3$ | 5.727 |
| Soda ash, $Na_2CO_3$ | 10.740 |
| Red lead, PbO | 14.920 |
| Barium carbonate, $BaCO_3$ | 7.757 |
| Fluor spar, $CaF_2$ | 6.563 |
| Antimony oxide, $Sb_2O_5$ | 4.773 |
| Sodium antimonate, $NaSbO_3$ | 7.160 |

These chemicals are mixed together and then the mixture is smelted.

This enamel is applied by the dry process and to do this, the enamel needs a certain amount of flexibility. This flexibility is supplied by the lead which is also used as a flux. The barium carbonate is also used as a flux and avoids the necessity of increasing the percentage of lead and does not decrease the durability of the enamel to any extent. The sodium antimonate is used for whiteness in conjunction with the antimony oxide, which gives opacity.

The first seven substances form the essential part of the invention, the last two being added as auxiliaries for the purposes stated. If desirable, the red lead may be decreased and borax or barium carbonate added in compensating weight volume; the antimony oxide may also be decreased and replaced by increasing the sodium antimonate or adding tin oxide SnO.

What I claim is:—

An enamel consisting of flint approximately 29.236 percent, borax approximately 13.127 percent, nitrate soda approximately 5.727 percent, soda ash approximately 10.740 percent, red lead 14.920 percent, barium carbonate approximately 7.757 percent, fluor spar approximately 6.563 percent, antimony oxide approximately 4.773 percent, and sodium antimonate approximately 7.160 percent.

CHARLES J. KASPAR.